United States Patent
Bolt

[15] 3,662,272
[45] May 9, 1972

[54] ELECTRONIC APPARATUS
[72] Inventor: Reginald C. Bolt, London, England
[73] Assignee: Molins Machine Company Limited, London, England
[22] Filed: Aug. 18, 1969
[21] Appl. No.: 851,016

[30] Foreign Application Priority Data

Aug. 22, 1968  Great Britain.....................40,309/68

[52] U.S. Cl..............................................328/104, 328/127
[51] Int. Cl........................................................G01r 5/22
[58] Field of Search.................320/1; 328/151, 104, 127; 307/240, 238, 235, 229

[56] References Cited

UNITED STATES PATENTS 3,032,714  4/1962  Cohen......................................320/1 X
3,360,738  12/1967  Harris et al..............................320/1

Primary Examiner—Donald D. Forrer
Assistant Examiner—B. P. Davis
Attorney—Craig, Antonelli & Hill

[57] ABSTRACT

A pulse adder, producing an output representing the sum of the amplitudes of a sequence of electric pulses, has a storage capacitor charged by each pulse and stabilizing means opposing any reduction of voltage across the storage capacitor. Apparatus is also disclosed for producing a signal representing the average value of continuously-variable voltage over a period, comprising switching means for chopping said voltage into pulses, two pulse adders receiving said pulses, one adder for pulses of each polarity, and a different amplifier receiving outputs from both adders at the end of the period and producing a signal representing the difference of the adder outputs, i.e. the aforesaid average value.

9 Claims, 3 Drawing Figures

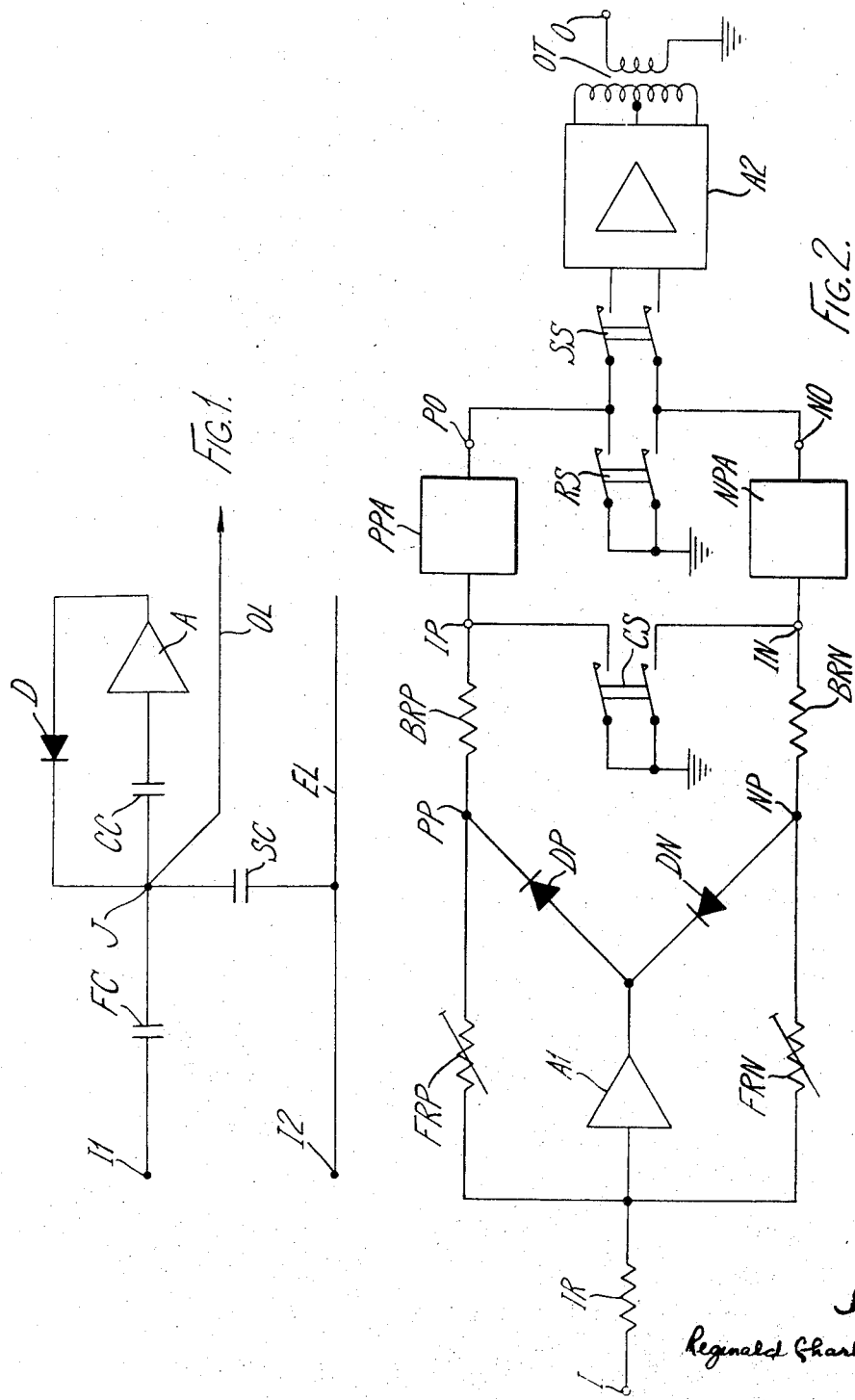

ELECTRONIC APPARATUS

This invention relates to electronic apparatus, more particularly to pulse adders, i.e. devices for producing an output representing the sum of the amplitudes of a sequence of electric pulses. Such pulse adders are useful in producing an indication of the mean value of a continuously varying electric signal, and the invention also comprehends apparatus for this purpose.

It is an object of the present invention to provide an improved pulse adder which, while efficient and accurate, is relatively simple and hence economic.

According to the invention, there is provided a pulse adder adapted to receive a sequence of electric input pulses and produce an output voltage representing the sum of the amplitudes of said input pulses, comprising a storage capacitor connected to receive input pulses via a feed capacitor, and stabilizing means having an input and an output both connected across said storage capacitor, said stabilizing means being so arranged that whenever the voltage at its input tends to change in one sense it delivers an output opposing such change but delivers no output in other conditions.

The two capacitors in such a pulse adder are, of course, connected in series to whatever may be the source of input pulses and, if there were no associated stabilizing means, said capacitors would simply charge at the beginning (leading edge) and discharge at the end (trailing edge) of each pulse; through the connection between the capacitors there would be a transfer of charge in one direction as the pulse began and in the other direction as it ended. While the capacitors remained charged, i.e. while a pulse persisted, after completion of charging, the voltages across the capacitors would be in inverse ratio to their capacitances, and in sum equal to the pulse amplitude.

Now considering the presence of the stabilizing means, and assuming that said means is arranged to respond to an attempted fall of its input voltage, the condition of the two capacitors will be charged as above when a first pulse is received, but at the end of that pulse, when the voltage across the storage capacitor would normally fall, as soon as such a fall begins the stabilizing means commences to deliver an output which opposes any such fall in voltage; with proper adjustment of the stabilizing means the voltage across the storage capacitor can be completely prevented from changing at the end of a pulse, except for a very small drop which is needed to cause operation of the stabilizing means and which for practical purposes is negligible. (It will be appreciated that the output of the stabilizing means supplies the charge which has to be returned to the feed capacitor).

Upon receipt of a second pulse, the storage capacitor is already at a potential which is a known fraction of the amplitude of the first pulse, and the two capacitors again charge, so that the voltage across the storage capacitor is increased by the same fraction of the amplitude of the second pulse; at the end of the second pulse, the stabilizing means again operates to prevent any material fall of voltage across the storage capacitor, which is thus left charged to a voltage equal to the known fraction of the sum of the amplitudes of the two pulses. A similar operation occurs in response to every subsequent pulse.

As just described, the voltage across the storage capacitor is of the same polarity as the pulses; moreover, it will be appreciated that the pulses must all normally be of the same polarity. If a pulse of opposite polarity occurs in the sequence, it will be apparent that the stabilizing means will operate at the beginning of the pulse, and not at the end, the net result being that the known fraction of the amplitude of this pulse will be added to the voltage across the storage capacitor without regard to its sign.

After receipt of any number of pulses, the voltage across the storage capacitor will equal the known fraction of the sum of the amplitudes of all the pulses, and hence proportional to the average value of the pulse amplitude. If such a pulse adder is to be used to determine the average amplitudes of the pulses in succeeding pulse sequences, each sequence containing the same number of pulses $n$, then if the storage capacitor has a capacitance $(n-1)$ times that of the feed capacitor it will be found that after receipt of a sequence of $n$ pulses the voltage across the storage capacitor will be $1/n$ times the sum of the pulse amplitudes, i.e. will equal the average pulse amplitude for that sequence.

As noted above, a pulse adder embodying the invention, if supplied with pulse not all of the same polarity, will add their amplitudes without regard to sign. If pulses of both polarities are required to be added algebraically, then this may be done by separating the pulses of one polarity from those of the other, giving two distinct sequences, adding the pulses of the two sequences in separate but identical pulse adders, and thereafter appropriately combining the two sums obtained.

Thus according to another aspect of the invention we provide apparatus for producing an electric signal representing the average value of a continuously variable electric voltage over a given period comprising cyclically operable switching means for chopping said continuously variable voltage into discrete pulses of uniform duration, means for separating said pulses according to polarity, two pulse adders connected to the separating means so that one adder receives all the pulses of one polarity and the other adder receives all the pulses of the other polarity, and a difference amplifier connected to receive outputs from both pulse adders at the end of said given period and arranged to emit an electric signal representing the difference of the adder outputs and hence representing the average value of the continuously variable voltage over said given period.

Such apparatus in effect constitutes an integrator for the continuously variable voltage, but has advantages as compared with known types of integrator. For example, the continuously variable voltage may represent the result of a continuous measurement of the product of a continuously operating machine, e.g. in a continuous-rod cigarette-making machine, the mass of tobacco per unit length in the cigarette rod produced. In such a case, the means value obtained using a conventional integrator, whose operation depends upon the time-constant of an R–C circuit, will be the mean over a particular time period and if the machine speed can vary the mean value will not be associated with a known number of cycles of the machine or quantity of product e.g. length of cigarette rod. With apparatus embodying the invention, the switching means can be operated in synchronism with the machine, so that the frequency of the pulses has a constant relation to machine speed, and we may conveniently provide means for causing the pulse adders to deliver outputs to the difference amplifier at intervals measured as a preselected number of operations of the switching means i.e. a predetermined number of pulses.

In order that the invention may be well understood, preferred embodiments thereof will now be described, referring to the accompanying drawings in which:

FIG. 1 is a schematic diagram of a pulse adder embodying the invention;

FIG. 2 is a schematic diagram of an integrating apparatus embodying the invention.

Figure 3:
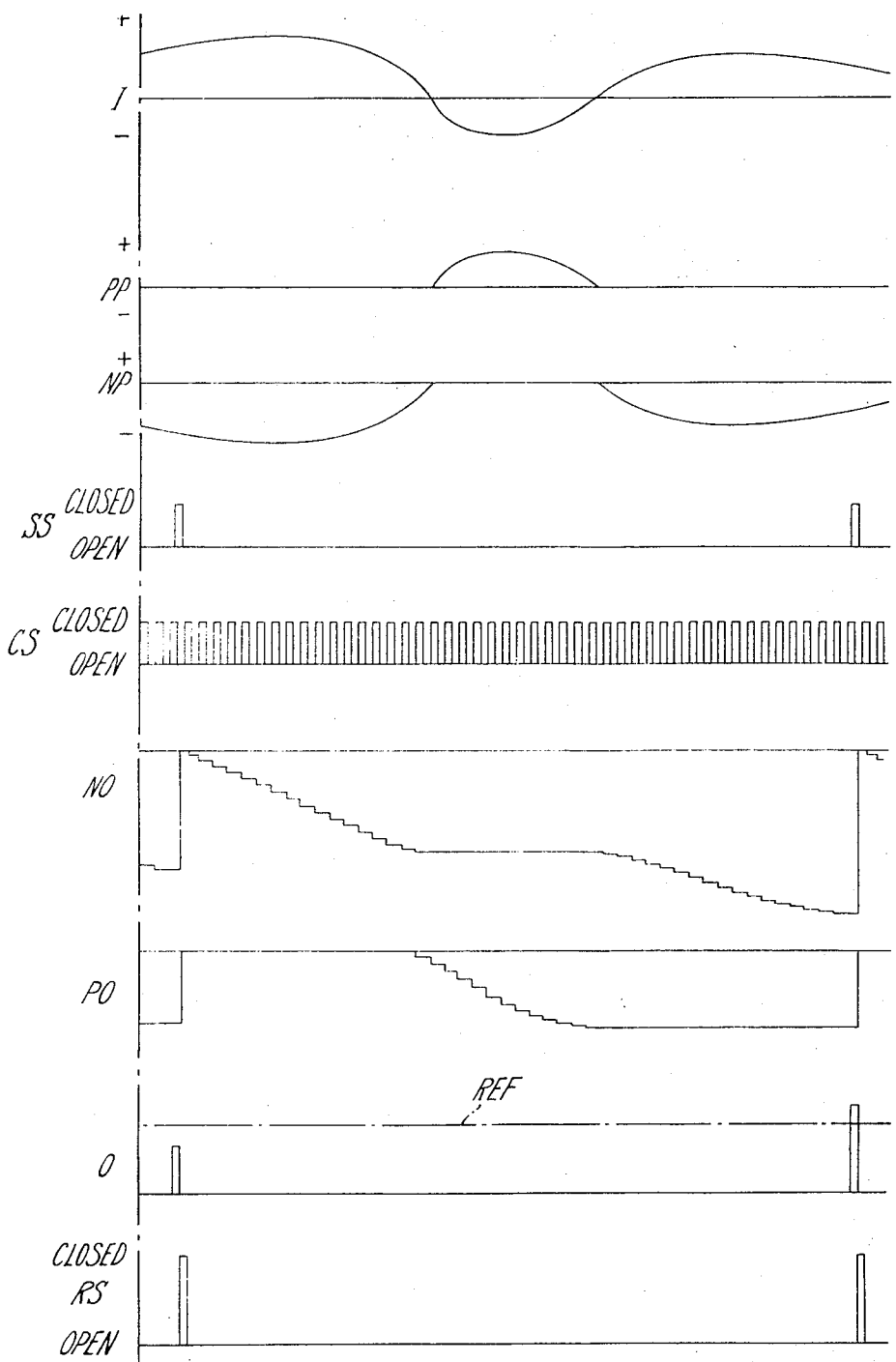
FIG. 3 is a diagram illustrating electric signals found in the apparatus of FIG. 2 during operation.

First referring to FIG. 1, the pulse adder circuit shown comprises a pair of input terminals I1, I2 across which are connected two capacitors in series, namely a feed capacitor FC connected to terminal I1 and a storage capacitor SC connected to terminal I2. A line EL connected to terminal I2 is conveniently the ground (zero-potential) line of the circuit.

A junction point J between said two capacitors is connected via a coupling capacitor CC to the input of an amplifier A; said amplifier is such that its output is 180° out of phase with its input, and said output is connected via a diode D back to the junction point J. An output line OL is also connected to said junction point.

In operation, assume that terminal I1 receives a sequence of pulses which are positive relative to terminal I2. Initially the capacitors FC, SC are uncharged and the first pulse causes the capacitors FC, SC to charge equally, so that the junction J reaches voltage V (relative to terminal I2) equal to $k \times PI$ where $$k = \frac{\text{Capacitance of FC}}{\text{Capacitance of SC} + \text{Capacitance of FC}}$$

PI = Amplitude of the first pulse.

The change in voltage at the junction point J affects the amplifier A, but this is immaterial as the resultant output from said amplifier is negative-going and hence is blocked by the diode D.

At the termination (trailing edge) of said first pulse, however, the two capacitors FC, SC attempt to discharge to their initial state, and the voltage of junction point J starts to fall. A negative-going signal therefore appears at the input of amplifier A, and a positive-going output is produced by the amplifier and fed through diode D to the junction point J. The output from amplifier A serves to reset the feed capacitor FC, i.e. to replace the charge which is not regained from storage capacitor SC, as the amplifier output prevents the voltage at point J from falling except for a small drop necessary to initiate operation of the amplifier. This drop is negligible if the gain of amplifier A is high, so that the voltage at J remains $V = kP1$.

When the second pulse (of amplitude P2) is received, the capacitors FC, SC charge as before, causing an increase in the voltage at point J of $k$ P2. The resultant voltage at point J is therefore $k(P1 + P2)$. At the termination of the second pulse, there is again a negligible drop in voltage at point J, the amplifier A again coming into operation to replace the charge in the feed capacitor FC.

After $n$ pulses have been received, (of respective amplitudes P1, P2, P3 ..... Pn), it will be apparent that the voltage at point J will be $k(P1 + P2 + P3 +... Pn)$ i.e. said voltage will be proportional to the sum of the amplitudes of the pulses. If desired, the voltage at point J can be arranged to be equal to the average value of said amplitudes by choosing such values for the capacitances that Capacitance of $SC = (n-1) \times$ capacitance of FC as then $k = 1/n$ In FIG. 2 is shown an integrating apparatus embodying the invention. A typical use for this apparatus is in association with a continuous-rod cigarette-making machine fitted with a weight monitor which delivers a continuous electrical signal whose voltage varies in accordance with the mass of tobacco per unit length of cigarette rod passing a detector head. In this context, the integrating apparatus is employed to produce, for each cigarette cut from the rod after it has passed the detector head, a discrete signal indicating the mean mass of tobacco per cigarette length. The apparatus of FIG. 2 will be described with reference to this use.

Turning therefore to FIG. 2, the apparatus shown comprises an input terminal I to which is supplied the continuously varying signal from the weight detector of the cigarette-making machine and said signal is fed via an input resistor IR to the input of an amplifier A1. The output of the amplifier is split through two oppositely-connected diodes DP, DN so that when the amplifier delivers a positive output (corresponding to a mass per unit length above a predetermined value) such output is fed through the diode DP to a positive signal point PP, while when the amplifier output is negative (indicating a mass per unit length below the predetermined value) the output is fed through the diode DN to a negative signal point NP.

The points PP, NP are connected via feedback resistors FRP, FRN respectively to the input of amplifier A1, the latter being arranged to give a phase reversal to signals passing through it so that said feedback resistors provide negative feedback. The feedback resistors FRP, FRN are both of the preset variable type and are used to balance the response of the part of the circuit so far described to negative and positive parts of the signal from the weight detector i.e. to give equal gains between the input terminal I and the two points PP, NP.

The point PP is connected via a ballast resistor BRP to input terminal IP of a pulse adder PPA, and the point NP is connected via a similar ballast resistor BRN to input terminal IN of a similar pulse adder NPA. The inputs of the pulse adders PPA, NPA are connected to different poles of a double-pole chopper switch CS which when closed connects said inputs to ground. A double-pole sampling switch SS connects the outputs of the two pulse adders to the two inputs of a difference amplifier A2, and the output of amplifier A2 is connected to an output transformer OT arranged to convert a balanced (push-pull) output from the amplifier to a "single-ended" output on an output terminal O. A double-pole reset switch RS connects to ground the outputs of the two pulse adders for resetting purposes.

The two pulse adders PPA, NPA are identical to one another, each being as shown in FIG. 1. The sampling switch SS and the chopper switch CS are operated repeatedly in synchronism with the cigarette-making machine; switch CS operates a selected number of times e.g. 48) for each operation of the cut-off mechanism of the cigarette-making machine (which divides the cigarette rod into individual cigarettes), while switch SS operates once for each operation of said cut-off mechanism. The synchronization of each operation of switch SS with the cigarette-making machine is such that the part of the cigarette rod which is at the detector head when switch SS operates is subsequently cut by the cut-off mechanism. Thus between two successive operations of switch SS, the continuously variable input signal received at terminal I represents the tobacco mass over a length of cigarette rod which does become an individual cigarette. Immediately after each operation of switch SS, the reset switch RS is closed for a brief period to reset the pulse adders i.e. to discharge their storage capacitors.

FIG. 3 illustrates, in correct relative timing, the voltages at various points of the apparatus of FIG. 2 during operation. (On the section showing the output at terminal O, the dashed line marked REF represents by way of example a possible reference level indicating the permitted weight tolerance; as shown the first pulse output indicates a cigarette weight within such tolerance while the second pulse output indicates a cigarette weight outside such tolerance.

I claim:

1. Apparatus for producing an electric signal representing the average value of a continuously variable electric voltage over a given period comprising an input circuit to receive such continuously variable voltage, two pulse adders of which one is arranged to add positive pulses and the other is arranged to add negative pulses, means for separating said voltage into positive and negative portions, cyclically operable switching means for chopping both portions of said voltage into discrete pulses of uniform duration, said separating means and said cyclically operable switching means both being connected between said input circuit and said pulse adders, and a difference amplifier connected to receive outputs from both pulse adders at the end of said given period and arranged to emit an electric signal representing the average value of the continuously variable voltage over the given period.

2. Apparatus as claimed in claim 1 in which the separating means comprises two diodes connected in opposite senses to the inputs of the pulse adders.

3. Apparatus as claimed in claim 2, in which the cyclically operable switching means comprises a double-pole chopping switch arranged when closed to connect the inputs of the pulse adders to ground.

4. Apparatus as claimed in claim 3, including a double-pole sampling switch connected between the outputs of the pulse adders and the difference amplifier, said sampling switch being arranged to close intermittently.

5. Apparatus as claimed in claim 4, including a double-pole reset switch arranged when closed to connect the outputs of the pulse adders to ground, said reset switch being arranged to close for a brief period immediately after each operation of the sampling switch.

6. Apparatus as claimed in claim 5, in which the chopping switch and the sampling switch are arranged to operate in synchronism with one another.

7. Apparatus as claimed in claim 6 in which the chopping switch is arranged to operate a selected number of times for each operation of the sampling switch.

8. Apparatus for producing an electrical signal representing the average value of a continuously variable electric voltage over a given period comprising polarity dividing chopper means responsive to said continuously variable electric voltage for generating a first pulsed signal representing the chopped positive polarity portions of said continuously variable voltage and a second pulsed signal representing the chopped negative polarity portions of said continuously variable voltage, first pulse adder means for adding the positive pulses of said first signal, second pulse adder means for adding the negative pulses of said second signal, and output means responsive to periodic outputs of said first and second pulse adder means for generating an output signal representing the average value of said continuously variable voltage over the given period.

9. Apparatus as claimed in claim 8, wherein said output means includes a difference amplifier, sampling switch means for periodically connecting the outputs of said first and second pulse adder means to inputs of said difference amplifier, and reset switch means for connecting the outputs of said first and second pulse adders to ground for a brief period immediately after each operation of said sampling switch means.

* * * * *